B. EDGAR.
Fish-Hook.

No. 196,648. Patented Oct. 30, 1877.

Witnesses
Fred G. Dietrich
Daniel Breed

Inventor
Butler Edgar by
O. Stont
atty

UNITED STATES PATENT OFFICE.

BUTLER EDGAR, OF ESPY, PENNSYLVANIA.

IMPROVEMENT IN FISH-HOOKS.

Specification forming part of Letters Patent No. 196,648, dated October 30, 1877; application filed October 13, 1877.

*To all whom it may concern:*

Be it known that I, BUTLER EDGAR, of Espy, in the county of Columbia and State of Pennsylvania, have invented certain new and useful Improvements in Fish-Hooks; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of my invention is to furnish a fish-hook that the fish cannot cast from its mouth, that will not tear the mouth of the fish to its death, and that is easily removed from the mouth.

Figure 1:
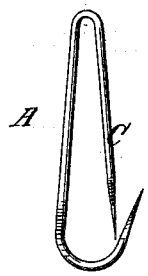

Figure 1 is a side view of the fish-hook ready for use. Figs. 2, 3, 4, and 5 are details of Fig. 1.

A is a fish-hook of the usual form, but without the barb, of any required size, made of a single piece of elastic wire, so extended as to form a stem or shank of the usual length, when it is doubled by a single coil, B, and carried back to the hook, which it almost, but does not quite, touch at a point usually occupied by the barb.

Figure 2:
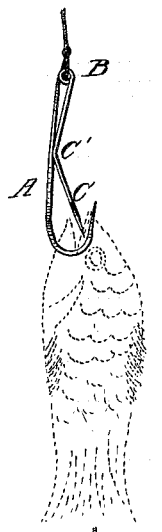
Figure 4:
Figure 3:
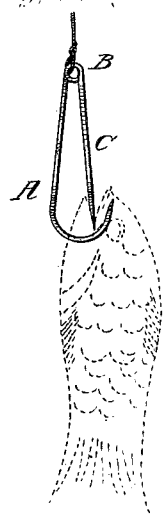
Figure 5:
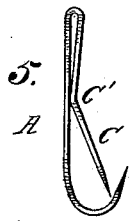

C is a tongue, made by extending one side of the coil B or the shank to the hook, and may be straight or bent K shape, as shown at C', Figs. 2 and 5.

The extremity of the tongue is drawn to a point as fine and sharp as that of the hook, and is designed to supply the office of the barb of the ordinary fish-hook, without producing the barb's injurious effects.

The hook may be constructed with or without the coil B, at the option of the manufacturer, its office being, in connection with the tongue, to constitute a spring, giving it, especially in large hooks, firmness and facility of motion.

Thus constructed, the hook cannot be cast from the mouth of the fish, and may be easily and readily removed by gently pressing down the tongue, without serious injury to the life or vigor of the fish.

I claim—

As a new article of manufacture, a barbless fish-hook, which may be removed without injury to the fish, consisting of a single wire forming a shank and hook, and doubled or bent to form a tongue, the latter extending to, or nearly to, the point usually provided with a barb, substantially as described.

In testimony that I claim the foregoing as my own invention I affix my signature in presence of two witnesses.

BUTLER EDGAR.

Witnesses:
HENRY WARD AUL,
WILLIAM H. NAGEL.